United States Patent

Johnson

[15] 3,706,263
[45] Dec. 19, 1972

[54] FLUIDIC STEERING CONTROL
[72] Inventor: Guy L. Johnson, Annapolis, Md.
[73] Assignee: The United States of America as represented by the Secretary of the Navy
[22] Filed: Sept. 25, 1970
[21] Appl. No.: 75,594

[52] U.S. Cl. .................... 91/388, 137/81.5, 114/150
[51] Int. Cl. ............................................. F15b 13/16
[58] Field of Search ............... 91/365, 388, 385, 364; 137/81.5; 114/150

[56] References Cited

UNITED STATES PATENTS

| 3,444,877 | 5/1969 | Atchley | 91/365 |
| 2,947,286 | 8/1960 | Baltus et al. | 91/365 |
| 2,970,575 | 2/1961 | Stern | 91/385 |
| 3,468,220 | 9/1969 | Lazar | 91/388 |

Primary Examiner—Samuel Feinberg
Attorney—R. S. Sciascia and Q. E. Hodges

[57] ABSTRACT

A fluidic control apparatus for controlling the displacement and speed of a ship's rudder (or diving planes) from a remotely located control wherein the amount and the speed of the displacement of the rudder is proportional to the input control.

2 Claims, 2 Drawing Figures

INVENTOR.
GUY L. JOHNSON
BY
ATTORNEY

FLUIDIC STEERING CONTROL

The invention described herein may be manufactured and used by or for the Government of the United States of America for Governmental purposes without the payment of any royalties thereon or therefor.

BACKGROUND OF THE INVENTION

This invention relates to a fluid operated system which utilizes the flow of a fluid so that the system performs functions which are analogous to functions now being performed by electronic components and systems, and relates more particularly to such a system employed for ship control.

Electronic systems and components are capable of performing such functions as detecting and amplifying a signal. However, it is also desirable that systems other than electronic systems perform the same analogous functions without requiring a source of electrical energy or delicate electronic components. While known mechanical systems will perform functions analogous to functions performed by electronic systems, these systems require large numbers of moving parts. Failure in any part usually results in improper operation or failure of the system.

SUMMARY OF THE INVENTION

The general purpose of this invention is to provide a fluidic system to control the displacement and speed of a ship's rudder or diving planes.

To attain this, the present invention provides a circuit of fluid amplifiers and interconnected hydraulic input and feedback transducers arranged so that error signal generated by said transducers, via a series of fluid amplifiers, initiates movement of a servo valve spool whose displacement controls the rate of an output actuator. The arrangement of input and feedback displacement transducers provide for a closed loop control system and ultimately provide for output displacement to be proportional to input displacement.

OBJECTS OF THE INVENTION

Broadly, therefore, it is an object of this invention to provide a fluid operated system which performs functions analogous to functions performed by existing electronic systems such as a system for ship control in this disclosure.

More specifically, it is an object of this invention to utilize a fluid operated system having a minimum of moving parts to control the amount and speed of the displacement of a ship's rudder from a remotely located control stand. The amount and speed of displacement of the rudder is to be proportional to an input at the control station.

Another object of the present invention is to provide a fluidic control system having a variable gain adjustment to adjust system for optimum response.

Another object of the present invention is to eliminate the reliance on mechanical valve spool centering springs for spool feedback. Centering springs being the prior fluidic art device causing the spool displacement to be proportional to the input signal. The present invention utilizes a flapper nozzle valve assembly installed in parallel with the input actuator feedback flapper nozzle valve assemblies, said assemblies being displacement-pressure transducers.

DESCRIPTION OF THE PREFERRED EMBODIMENT

Figure 1:
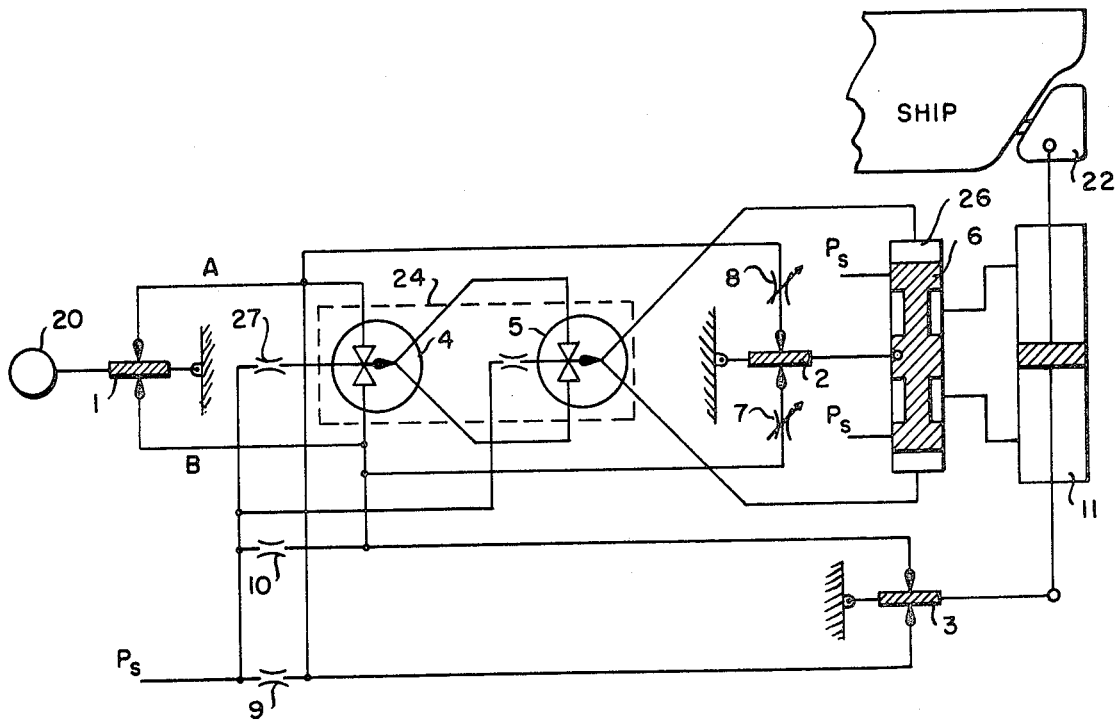
FIG. 1 is a schematic drawing of the fluidic circuitry of the invention.

With continued reference to the drawing, FIG. 1 shows the fluidic control circuit arranged to make the rudder displacement proportional to the ship's steering control displacement. The circuit comprises: three flapper nozzle valve assemblies or potentiometers (devices for converting mechanical displacement into fluid pressures differentials, said pressure differential being proportional to the displacement imposed on each flapper nozzle valve); an input flapper nozzle valve 1, attached directly to ship's steering control 20; an actuator feedback flapper nozzle valve 3, attached to the actuator 11 of the rudder; and a spool feedback flapper nozzle valve 2, attached to the control valve spool 6. These three flapper nozzle valves are all connected in parallel to feed the amplifier assembly 24.

An error signal is generated by input flapper nozzle valve 1. Error signal is the difference between the existing displacement of the rudder and the displacement the ship's steering control 20 is calling for. Any error signal pressure generated is imposed on the first amplifier 4 by the feedlines A and B. This pressure differential is then amplified and is imposed on the end of the spool 6. The amplifier output pressure differential acting on the ends of the spool 6 causes the spool to displace. The spool displacement allows flow from the hydraulic power supply Ps to the actuator 11 to move the rudder 22. The two feedback flapper nozzle valve assemblies 2 and 3 are arranged such that their displacement subtracts from the initial error signal set by the input flapper nozzle valve 1. Movement of the input flapper nozzle valve 1 will generate a positive error signal across the fluid amplifier assembly 24 causing the spool 6 to move and when spool 6 moves the spool feedback flapper nozzle valve 2 will move and tend to reduce some of the initial error signal pressure differential caused by the movement of the input flapper nozzle valve assembly 1. If the initial error signal was sufficiently great the spool 6 displaces and hits a hard stop (not shown) and can move no further. At this point the hydraulic flow through the valve 26 to the actuator 6 cannot increase any further and the ship's rudder change rate will become constant. If the initial error signal was not as great the spool 6 will displace to a point where the pressure differential generated by the spool feedback flapper nozzle valve 2 would cancel or completely negate the initial error signal initiated by the input flapper nozzle valve 1. At this point the spool 6 will then stop moving and the flow through the spool valve 26 would be less than the maximum flow and, therefore, the rudder change rate would not be as great as if a larger initial error signal pressure was imposed. In this condition, i.e., where the initial error signal was small, it is re-emphasized that the spool 6 would stop moving when displaced a certain amount because the feedback pressure differential from the spool feedback flapper nozzle valve 2 completely cancels the error signal and with a canceled error signal the amplifier no longer amplifies and, therefore, there is no pressure differential across the spool 6.

As the actuator 11 moves, the actuator feedback flapper nozzle 3 will continue to reduce the error signal so that, ultimately the error signal will go negative and reverse pressure differential across the amplifier and cause the spool 6 to start returning to the neutral position. The rudder will ultimately reach a displacement where the actuator feedback flapper nozzle valve 3 is completely cancelling the initial error signal imposed by the input flapper nozzle valve 1 and the spool feedback flapper nozzle valve will be at the neutral position.

The flapper assemblies are supplied high pressure fluid (hydraulic oil at 3,000 psi) from the hydraulic power supply Ps through dropping orifices 9, 10 and 27. The combination of the dropping orifices items 9, 10 and 27 and the variable orifices of the flapper nozzle valve assembly determine the magnitude of the error signal pressures developed.

The amplifiers 4 and 5, which comprise the amplifier assembly 24, serve two functions. First, if the spool 6 sticks the output of the amplifier assembly is simply error signal pressure amplified and the pressure will increase to the point where a sufficient force is applied across the end of the spool 6 to breakout the spool. Second, once the spool does start moving the pressure level drops off and the output of the amplifier is a simple flow to move the spool at the necessary rate.

Figure 2:
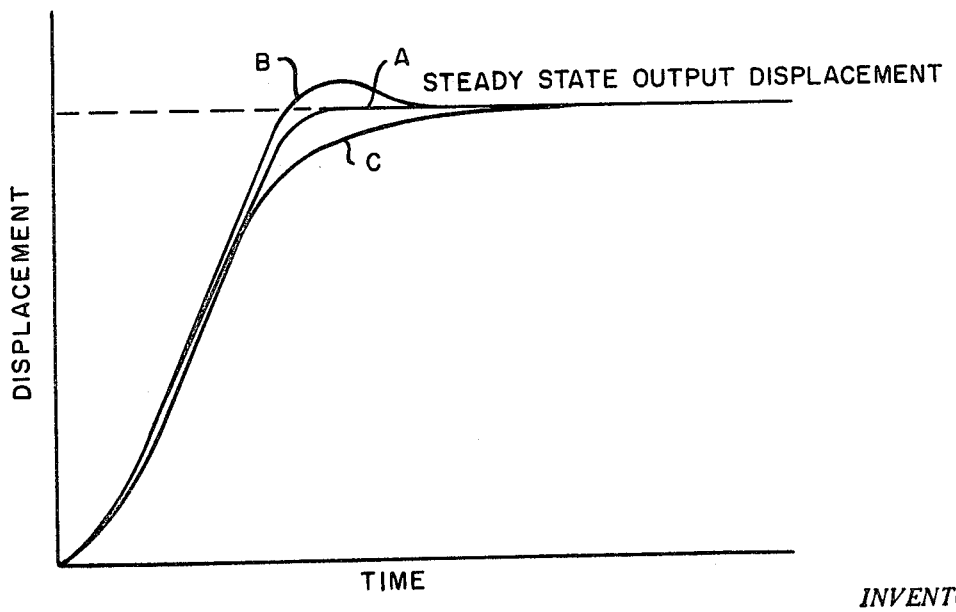
FIG. 2 is a graph of system response as effected by the variable gain controls.

In the past the general control systems have been electrical-hydraulic systems and variable gain was provided in the system by adjusting the gain of the electrical amplifiers. A variable gain adjustment is necessary for trimming out the system, for example, the actuator, if the control system is not properly trimmed, may move in such a way that when it homes in on the final position there is an excessive over-shoot, it oscillates for a period and then settles in a final steady position. This is a case where there is too much gain in the system as illustrated in curve B of FIG. 2. Another situation occurs where there is too little gain. The control surface (rudder) squeezes in on the final steady state position as illustrated in curve C. This is also undesirable. The optimum situation is illustrated in curve A of FIG. 2 where the control surface homes in on the steady state position rapidly with no squeeze or overshooting. In the case of the present fluidic system the variable gain feature is provided, not by adjusting the gain of the amplifiers, but rather by the introduction of variable gain adjustment orifices 7 and 8 as shown in FIG. 1. If for instance we have a low gain situation where the actuator of the control surface is squeezing in on a steady state output position as illustrated by curve C of FIG. 2, the gain is adjusted by reducing the orifice area of the variable gain adjustment orifices 7 and 8. This reduces the effect of the variable orifices of the spool feedback flapper nozzle valve 2 such that for a given spool displacement the error signal pressure differential capable of being generated by the spool flapper nozzle valve is less than if the dropping orifices were wide open. This results in less system error signal pressure being required to hold a spool at any given position and in turn this will result in the actuator holding its maximum velocity longer and approaching the steady state position more closely before the spool 6 starts to return to neutral.

The spool feedback flapper nozzle valve 2 is designed to be less effective than the other two flapper nozzle valve assembly items 1 and 3. The error signal produced to drive the spool 6 to its maximum design displacement will be approximately one-half of the maximum error pressure signal that can be generated by either flapper nozzles 1 or 3. As illustration, the condition when the ship's steering control 20 is thrown hard-over. This will generate a 70 psi differential across the first amplifier 4 and this in turn will start the spool 6 moving but the spool feedback flapper nozzle valve 2 can only cancel 30 psi of the initial input error signal and this reduces the error signal across the amplifiers to 40 psi. The spool will be held against the hard stop as high pressure fluid continues to move the actuator 11 and the feedback flapper nozzle valve 3. As the actuator 11 continues to move the actuator feedback flapper nozzle, valve 3 will eventually cancel the 40 psi error pressure remaining. At this point the error signal across the amplifier is zero but the spool 6 is still hard-over and the actuator 11 is still moving at its designed rate, its maximum rate set by the spool displacement. Further movement of the actuator will now continue to move the feedback flapper nozzle valve 3 causing the error signal to become negative thereby reversing the pressure differential across the spool 6 causing it to start to return to neutral where it will shut flow off and stop the actuator 11.

Another example, start with a smaller initial error signal, 20 psi, generated across the amplifier assembly. The spool feedback flapper nozzle valve is capable of producing 30 psi. As the spool moves, the spool feedback flapper nozzle assembly valve 2 cancels the entire initial input signal of 20 psi. The spool has been moved to some position not quite its maximum design displacement and it has stopped because the spool feedback flapper nozzle valve has canceled the error signal across the amplifier. Now any actuator movement causes the feedback actuator flapper nozzle valve 3 to move and will cause the error signal to go negative, which, as before, will start to return the spool to neutral and thereby stop the actuator.

It will be apparent from the foregoing that the invention provides fluidic apparatus of novel and advantageous construction for controlling the displacement and speed of a ship's s rudder, or the like, from a remotely located control.

It is understood that the invention is not limited to the exact details of construction shown and described, for obvious modifications will occur to persons skilled in the art. It is therefore to be understood that within the scope of the appended claims the invention may be practiced otherwise than as specifically described.

What is claimed is:

1. A fluid control system for controlling the amount and speed of the displacement of a ship's control surface, comprising:
   an input means;
   a first fluidic potentiometer connected to said input means to generate a first pressure differential proportional to the displacement of said input means;
   an actuator connected to the ship's control surface;
   a second fluidic potentiometer connected to said actuator to generate a second pressure differential proportional to actuator displacement;
   a spool valve connected to the actuator to displace the actuator;

a third fluidic potentiometer connected to said spool valve to generate a third pressure differential proportional to spool displacement;

manifold means interconnecting said first, second, and third fluidic potentiometers to algebraically sum said first, second, and third pressure differentials; and a fluidic amplifier whose input is connected to said manifold means to receive said algebraically summed first, second, and third pressure differentials, the output of said fluidic amplifier being connected to the ends of said spool valve to displace the spool accordingly.

2. A fluid control system as in claim 1 further including a variable orifice connected between said third fluidic potentiometer and said manifold means to vary system response.

* * * * *